US 6,633,565 B1

(12) United States Patent
Bronstein et al.

(10) Patent No.: US 6,633,565 B1
(45) Date of Patent: Oct. 14, 2003

(54) APPARATUS FOR AND METHOD OF FLOW SWITCHING IN A DATA COMMUNICATIONS NETWORK

(75) Inventors: Zvika Bronstein, Ramat Efal (IL); Opher Yaron, Tel Aviv (IL); Gennady Dosovitsky, Rishon Letzion (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/342,465

(22) Filed: Jun. 29, 1999

(51) Int. Cl.[7] .............................................. H04L 12/28
(52) U.S. Cl. ...................................................... 370/392
(58) Field of Search ................................. 370/229, 230, 370/351, 352, 353, 355, 381, 389, 392, 397, 398, 399, 395.5; 711/108, 117, 118, 119, 122, 216

(56) References Cited

U.S. PATENT DOCUMENTS

| | | | | |
|---|---|---|---|---|
| 5,546,387 A | * | 8/1996 | Larsson et al. | 370/392 |
| 5,872,783 A | * | 2/1999 | Chin | 370/395.32 |
| 6,014,380 A | * | 1/2000 | Hendel et al. | 370/392 |
| 6,147,993 A | * | 11/2000 | Kloth et al. | 370/392 |
| 6,181,699 B1 | * | 1/2001 | Crinion et al. | 370/392 |
| 6,188,689 B1 | * | 2/2001 | Katsube et al. | 370/389 |
| 6,243,667 B1 | * | 6/2001 | Kerr et al. | 703/27 |
| 6,259,699 B1 | * | 7/2001 | Opalka et al. | 370/389 |
| 6,275,492 B1 | * | 8/2001 | Zhang | 370/392 |
| 6,295,296 B1 | * | 9/2001 | Tappan | 370/392 |
| 6,341,127 B1 | * | 1/2002 | Katsube et al. | 370/230 |
| 6,389,023 B1 | * | 5/2002 | Matsuzawa et al. | 370/395.31 |
| 6,512,766 B2 | * | 1/2003 | Wilford | 370/389 |

OTHER PUBLICATIONS

Chisvin et al. "Content–Addressable and Associative Memory: Alternatives to the Ubiquitous RAM". IEEE Computer. Jul. 1989. pp. 51–64.*
McAuley et al. "Fast Routing Table Lookup Using CAMS". IEEE INFOCOM. Mar. 28, 1993–Apr. 1, 1993. Pp. 1382–1392.*
Article: "IP Switching" Aug. 16, 1997.
Network Working Group, Feb. 1997.
Article: "Tag Switching, . . . "Cisco Systems 1998.

* cited by examiner

*Primary Examiner*—Melvin Marcelo
*Assistant Examiner*—Derrick W Ferris
(74) *Attorney, Agent, or Firm*—Howard Zaretsky

(57) ABSTRACT

An apparatus and associated method for performing flow switching (tag switching) in a frame switching environment. The flow switching apparatus provides a mechanism whereby flows are identified and tags assigned to them. The identification and assignment of tags to flows is made Independently of other network entities and does not require communications with any other entities within the box itself or other entities in the network. The forwarding decisions are calculated once and stored in a cache or a look up table which can be accessed very quickly. The tag is used as an index into the cache or LUT such that if an entry is found in the cache or LUT for that particular tag, the forwarding decision does not have to be made again. This serves to greatly reduce the time to obtain a forwarding decision which is used by the switching fabric in steering the input frame to the appropriate output port(s). Multiple queues are used along with the cache to facilitate the forwarding of the frames. Frames that generate a cache miss are stored in a slow queue to await software processing. Once a forwarding decision is made, all the frames in the queue are switched at once. Frames that generate a hit are placed on a fast queue for expedited processing.

27 Claims, 10 Drawing Sheets

APPARATUS FOR AND METHOD OF FLOW SWITCHING IN A DATA COMMUNICATIONS NETWORK

FIELD OF THE INVENTION

The present invention relates generally to data communication switching systems and more particularly relates to an apparatus for and method of flow switching in a data communications network.

BACKGROUND OF THE INVENTION

More and more reliance is being placed on data communication networks to carry increasing amounts of data. In a data communications network, data is transmitted from end to end in groups of bits which are called packets, frames, cells, messages, etc. depending on the type of data communication network. For example, Ethernet networks transport frames, X.25 and TCP/IP networks transport packets and ATM networks transport cells. Regardless of what the data unit is called, each data unit is defined as part of the complete message that the higher level software application desires to send from a source to a destination. Alternatively, the application may wish to send the data unit to multiple destinations.

Currently, many switching systems utilize switching fabrics or matrixes that are designed to switch either fixed or variable length frames or packets of data. The frames are received from one or more input ports and fed into the switching matrix. The header of each frame is used to calculate a forwarding decision for the particular frame. The forwarding decision is used by the switching matrix to steer the frame to one or more output port(s).

A bottleneck in prior art switching systems is the time delay required to calculate a forwarding decision for each frame. Frames input to the matrix must wait for the forwarding decision before they can be switched, i.e., output to a port. Thus, there is a strong felt need for a mechanism whereby frames can be switched at line or wire speed without the delays associated with the calculation of the forwarding decision.

SUMMARY OF THE INVENTION

The present invention is an apparatus and associated method for performing flow switching in a frame-switching environment. Flow switching is applicable to data communication systems wherein data is switched on a frame basis utilizing separate data and control paths. The invention provides a means of implementing flow switching which functions in the control path of the frame switching process.

Three main operations are involved in switching frames at very high rates. The first operation is the control path that involves analysis of the frame header and subsequently making a forwarding decision as to where to send the frame. The second operation involves the movement of the data from the input port to an output port. Typically, this operation is performed within the data path structure due to the necessity to read and write bits and/or bytes to and from high bandwidth memories, backplanes, etc. at very high speed. The third operation is the frame formatting manipulation that is based on the forwarding decision and the type of the frame to be output. All three operations must be performed fast enough to keep up with the data rate of the incoming frames and the required output data rate of the frames to be output.

The flow switching apparatus of the present invention is mainly applicable to the first and third operations described above, i.e., the control path and frame formatting. The invention assumes that the second operation is performed using well-known standard techniques and is thus outside the scope of the present invention.

The flow switching apparatus provides a mechanism whereby flows are identified and tags assigned to them, The tags assigned are relatively short in length, e.g., 16 bits, while the frame headers may be tens of bytes. The forwarding decisions are calculated once and stored in a cache or a look up table that can be accessed very quickly. The tag is used as an index into the cache or LUT (Look-Up Table) such that if an entry is found in the cache or LUT for that particular tag, the forwarding decision does not have to be made again. This serves to greatly reduce the time to obtain a forwarding decision that is used by the switching fabric in steering the input frame to the appropriate output port(s). space and time whereby there are only a finite number of tags that are applicable, i.e., in use, at any one time. The principle of locality guarantees that in most cases, for a given port and during a given time period, only a subset of the entire range of possible flows are present in the system. It is in cases such as this that caches become very effective since they expedite the performance for those flows captured inside the cache.

The assignment of tags to flows expedites the processing of the frames in network entities that implement the apparatus and method of the present invention. The use of cache provides a means of identifying data items or entries in the cache, such as forwarding decisions and header substitutions.

The present invention functions to assign tags based on a comparison of the frame headers without the need to process the contents of the frame or packet itself in accordance with one or more complex rules. Thus, the assignment of tags is not complex. The forwarding decisions, however, may be governed by one or more complex rules but this processing occurs in the switching controller portion of the invention and not the I/O processor portion. The tag, unrecognized at first, is processed by the switching controller (typically using slower speed hardware or software processing) and a forwarding decision is made. The results of the decisions are placed in a cache for future reference. In particular, the forwarding decisions and the new header to be substituted for the old one are placed in the cache.

To achieve fast substitution of tags, i.e., fast processing of frames, a fast cache, preferably hardware based, is used. Note that the invention may be implemented using multiple levels of cache. A tag assignment cache is located in the I/O processor and is typically limited in size. Preferably, the primary cache is hardware based and the fastest, following by fast hardware forwarding, then a fast software cache and then a slow software forwarding process. The primary cache is preferably bigger than the individual tag assignment caches in the I/O processors, but may be less than the aggregate sum of all the tag assignment caches. The secondary cache, is preferably at least equal in size to the sum of all the tag assignment caches in the I/O processors. Thus, together, the primary and secondary caches cover all the tag assignment caches in the individual I/O processors. Note that it is not mandatory that the secondary software cache be equal to or bigger than the aggregate sum. If it is, however, it simplifies the cache update mechanism. When a new tag is assigned, replacing a previous entry becomes simpler.

The present invention also comprises various tag queues that are used in the forwarding process. Frames whose tags are found in the primary cache are placed on a fast queue where they are processed and output quickly. Frames whose associated tags cause a miss on the primary cache are placed on a slower queue whereby the forwarding decision may be calculated using hardware or software. A plurality of tag queues are used with each tag queue storing frames associated with an individual tag. Thus, all frames of the same flow are switched together once their forwarding is resolved.

Note that an important aspect of the invention is that the various components within a network element and between different network elements do not need to communicate with each other in order to synchronize tags. Each entity, i.e., input port, network element box, etc. is adapted to analyze, identify and assign tags to the respective flows, i.e., frames, passing through each.

There is provided in accordance with the present invention, in a data communications network, a method of switching data utilizing tags, the method comprising the steps of identifying flows from a plurality of data frames received from the network via a plurality of input ports, assigning a tag to each unique flow identified and storing each unique flow and associated tag in a tag assignment cache, calculating a forwarding decision and substitute header for each unique flow received and storing the results of the forwarding decision, substitute header and the tag associated therewith in a tag forwarding cache, retrieving a forwarding decision and substitute header associated with a tag from the tag forwarding cache upon the occurrence of a cache hit on the tag, modifying the received data frame in accordance with the forwarding decision and substitute header corresponding to the tag previously assigned to the data frame and forwarding the data frame with the substitute header to the appropriate output port in accordance with the forwarding decision corresponding thereto.

The steps of identifying and assigning are performed independently of and without any communications required to other network entities. The tag forwarding cache comprises a primary tag forwarding cache implemented in hardware and a secondary tag forwarding cache implemented in software adapted to operate at a slower speed than the primary tag forwarding cache. Each flow comprises the frame header or portions thereof that embody the criteria for identifying the particular flow. The tag assignment cache comprises records containing fields representing a flow ID, flow description and tag assignment. The tag forwarding cache comprises records containing fields representing a tag ID, forwarding data and substitute header. The method further comprises the step of providing a third cache adapted to store the results of forwarding decisions and their associated tags, the third cache having a number of entries at least equal to the aggregate sum capacity of the first caches in each of the plurality of input ports, and whereupon a miss in the second cache the forwarding decision is retrieved from the third cache upon a hit on the tag.

In addition, the method further comprises the steps of storing incoming frames in one of a plurality of slow queues in the event a frame generates a miss on the tag forwarding cache requiring the calculation of a forwarding decision, each the slow queue associated with a separate tag and forwarding all frames within a slow queue at one time once a forwarding decision has been calculated for the flow corresponding to the frames.

There is also provided in accordance with the present invention, in a data communications network, a method of switching data utilizing tags, the method comprising the steps of identifying flows from a plurality of data frames received from the network via an input port, assigning a tag at random to each unique flow identified and storing each unique flow and associated tag in a first cache, retrieving a forwarding decision associated with the tag from a second cache upon the occurrence of a cache hit on the tag, calculating a forwarding decision for the flow associated with a tag if the tag is not found in the second cache, storing the results of the forwarding decision and the tag associated therewith in the second cache and forwarding the data frame to the appropriate output port in accordance with the forwarding decision corresponding thereto.

There is further provided in accordance with the present invention a tag switching apparatus for use in a data communications network comprising an I/O processor comprising a plurality of input ports, each input port comprising a first cache for storing tags and flows associated therewith, a tag processor for identifying flows from a plurality of data frames received from the network via an input port, and for assigning a tag at random to each unique flow identified such that no two flows are assigned the same tag and storing each unique flow and associated tag in the first cache, a controller comprising a second cache and a header processor adapted to retrieve a forwarding decision associated with a tag from the second cache upon the occurrence of a cache hit on the tag, the header processor adapted to calculate a forwarding decision for the flow associated with a tag upon a miss in the second cache and to store the results of the forwarding decision and the tag associated therewith in the second cache.

The apparatus further comprises a switching fabric adapted to forward data frames to their appropriate output port in accordance with the forwarding decision corresponding thereto. The second cache comprises a cache implemented using hardware. The apparatus further comprises a third cache adapted to store the results of forwarding decisions and their associated tags, the third cache having a number of entries at least equal to the aggregate sum capacity of the first caches in each of the plurality of input ports, and whereupon a miss in the second cache the forwarding decision is retrieved from the third cache upon a hit on the tag.

The apparatus further comprises a plurality of slow queues for storing incoming frames in the event a frame generates a miss on the second cache requiring the calculation of a forwarding decision, each the slow queue associated with a separate tag, and once a forwarding decision has been calculated for the flow corresponding to the frames, all frames within a slow queue are forwarded at one time.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
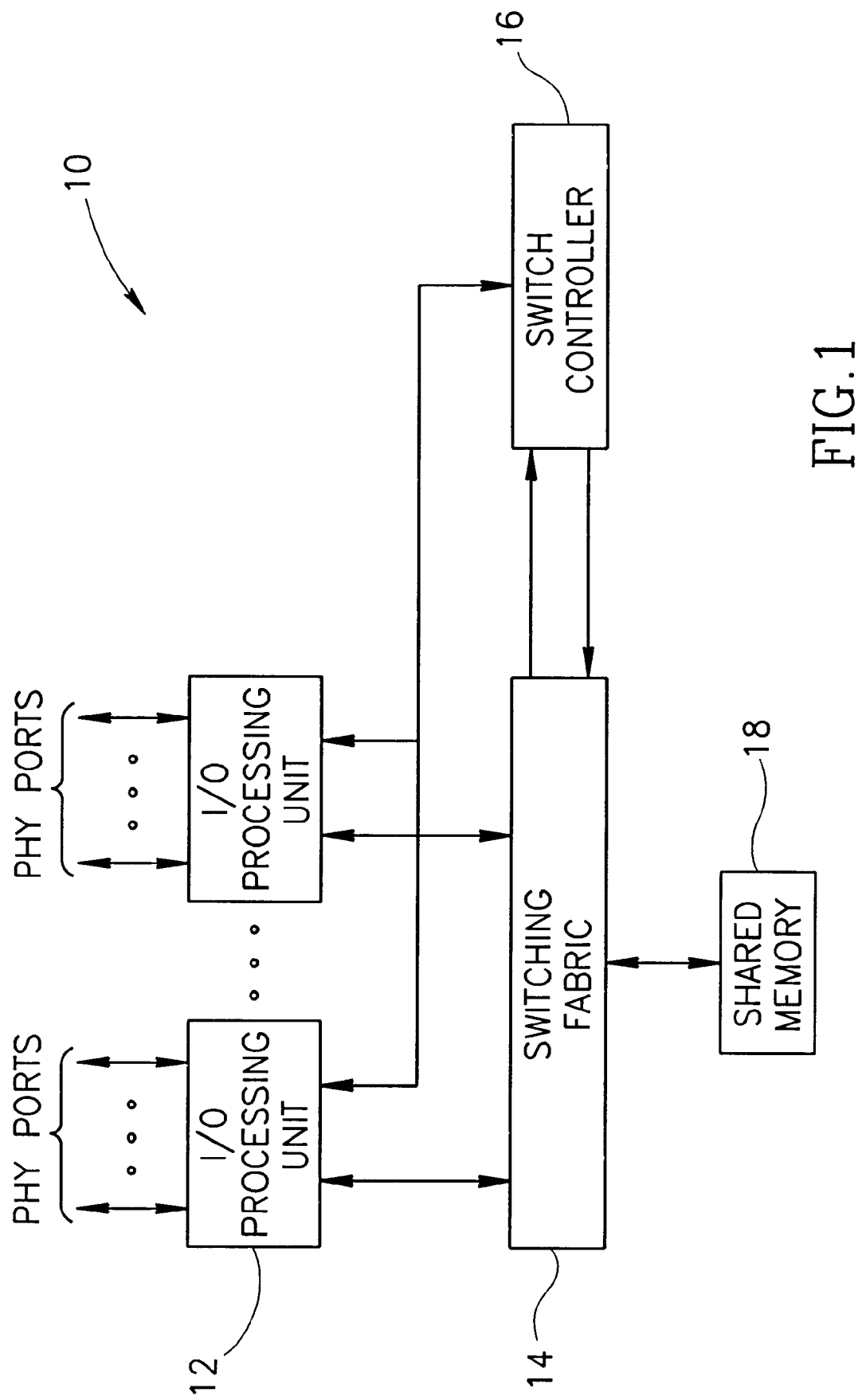
FIG. 1 is a block diagram illustrating a first embodiment of the flow switching apparatus of the present invention.

The following notation is used throughout this document.

| Term | Definition |
| --- | --- |
| APR | Address Resolution Protocol |
| ATM | Asynchronous Transfer Mode |
| CAM | Content Addressable Memory |
| CoS | Class of Service |
| FTP | File Transfer Protocol |
| HTTP | Hypertext Transport Protocol |
| I/O | Input/Output |
| IP | Internet Protocol |
| LANE | LAN Emulation |
| LUT | Look Up Table |
| MPOA | Multiprotocol Over ATM |
| NIC | Network Interface Card |
| TCP | Transaction Control Protocol |
| VLAN | Virtual Local Area Network |

General Description

The present invention is an apparatus and associated method for performing flow switching in a frame-switching environment. Flow switching (also referred to as tag switching) is applicable to switching systems that make forwarding decisions based on contents of data units, e.g., frames, packets, etc., being forwarded, i.e., switched (frames, packets, etc.). To aid in illustrating the principles of the present invention, the invention is described in the context of a network switching environment. In this example, the invention serves to provide a means of implementing flow switching which functions in the control path of the frame switching process. Note, however, that the flow switching apparatus and method of the invention are applicable to any system that bases switching decisions on the contents of the data being switched.

Three main operations are involved in switching frames at very high rates. The first operation is the control path that involves analysis of the frame header and subsequently making a forwarding decision as to where to send the frame. The second operation involves the movement of the data from the input port to an output port. Typically, this operation is performed within the data path structure due to the necessity to read and write large amounts of data to and from high bandwidth memories, backplanes, etc. at very high speed. The third operation is the frame formatting manipulation that is based on the forwarding decision and the type of the frame to be output. The frame formatting manipulation is mostly concerned with the frame header (and optionally the trailer too) with no change to the frame payload itself. All three operations must be performed fast enough to keep up with the data rate of the incoming frames and the required output data rate of the frames to be output.

The flow switching apparatus of the present invention is mainly applicable to the first and third operations described above, i.e., the control path and frame formatting. The invention assumes that the second operation is performed using well-known standard techniques and is thus outside the scope of the present invention.

The invention comprises three embodiments wherein each embodiment performs flow switching whereby a tag is used to speed up the forwarding process. For each frame that arrives at the input, a forwarding decision must be made as to where to send the frame on output. Forwarding decision means, implemented either in software or hardware is used to determine the forwarding decision. Typically, this operation is more practically performed in software rather than in hardware. Thus, the forwarding decision process is relatively slow.

To speed up the process, a tag is assigned to input frames that have one or more features in common. These frames are assigned to a flow that is defined as a sequence of frames with some connection between them as identified by the frame header. Once a flow is defined, a forwarding decision need only be calculated once and the results repeated for each frame belonging to that flow. In this fashion, very high forwarding rates can be achieved such that frames can be processed at line speed. The embodiments will now be described in detail beginning with the first.

First Embodiment: Tag Assignment by Switch Controller

The first embodiment will now be described in more detail. A block diagram illustrating a first embodiment of the flow switching apparatus of the present invention is shown in FIG. 1. The flow switching apparatus, generally referenced 10, comprises a plurality of I/O processing units 12 coupled to a switching fabric 14 and a switch controller 16. The switching fabric 14 utilizes and communicates with shared memory 18. Each of the I/O processing units 12 is coupled to one or more PHY (physical layer) ports. Note that it is not essential that memory 18 be shared memory. The flow switching of the present invention can operate without the use of shared memory.

The flow switching apparatus 10 may be implemented as part of a network switch or other network element. An example is an Ethernet switch that is capable of communication over a variety of data formats and speeds. For example, I/O processing units 12 may be adapted to communicate with standard Ethernet (10 BaseT), Fast Ethernet (100 BastT), Gigabit Ethernet (1000 BaseT) or ATM signal protocols. In addition to providing Layer 2 switching, the network switch may also be adapted to provide support for VLANs, Bridging, LANE, MPOA, IP Routing, for example.

In operation, the I/O processing units 12 convert the various types of input data, e.g., Ethernet, Fast Ethernet, ATM, etc., into a universal common format. The frames are input to the switching fabric 14 where they are forwarded to the appropriate output port. The switching fabric 14 utilizes the shared memory 18 to temporarily store the input frames during the forwarding process. The forwarding decisions are not made by the switching fabric 14 but by the switch controller 16. The switch controller 16 receives a portion of the frames that includes the header, and makes forwarding decisions based upon selected criteria.

The switching fabric 14 transmits frame header information to the switch controller 16 that is operative to transmit forwarding information in return. Depending on the load applied to the switch controller, the switching fabric may have to wait for the results of the forwarding decision calculation. Upon input to the switch controller, the frame headers are input to a header queue. A forwarder processes the header information in sequential fashion with the results transmitted back to the switching fabric.

To speed the forwarding decisions in the switch controller, a tag is assigned to each unique flow. A cache is used to store forwarding decisions already calculated. Using the tag as an index to this cache, the forwarding decision is read from the cache without the need to calculate it again.

Figure 2:
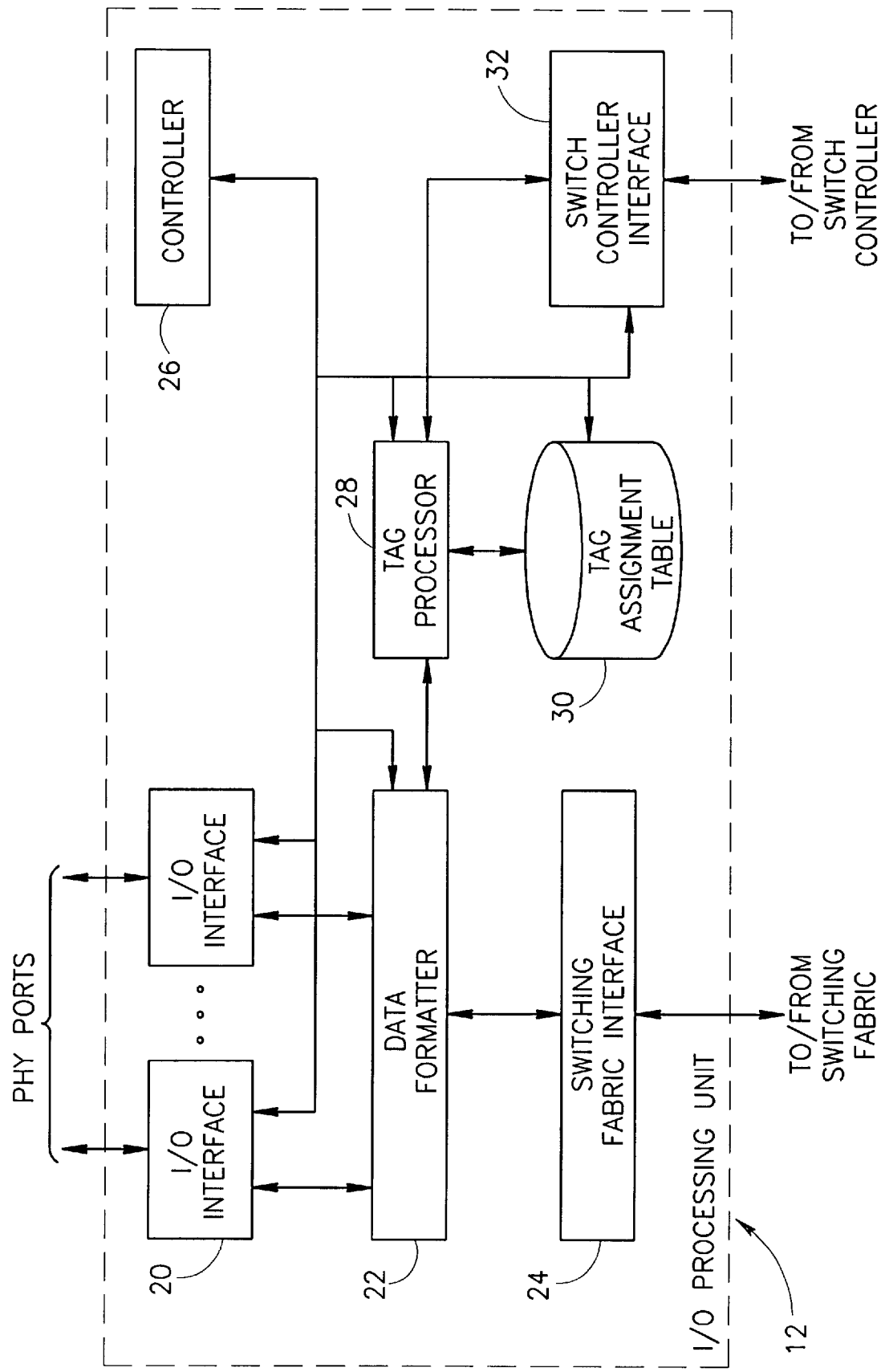
FIG. 2 is a block diagram illustrating the I/O processing unit of the first embodiment of the present invention in more detail.

The I/O processing unit will now be described in more detail. A block diagram illustrating the I/O processing unit of the first embodiment of the present invention in more detail is shown in FIG. 2. The I/O processing unit 12 comprises a plurality of I/O interfaces 20, a data formatter 22, switching fabric interface 24, switch controller interface 32, tag processor 28, tag assignment table 30 and controller 26.

One of the functions of the I/O processing unit is to recognize the mapping that was previously assigned between a frame and a corresponding flow. A tag is used to identify a frame belonging to a particular flow. The tag is appended to the frame and later used as an index for lookup purposes to determine the forwarding decision to use for the frame. Each frame that is received by the I/O processing unit via the I/O interface 20 is analyzed by the tag processor 28. The tag processor 28 analyzes the frame header and functions to assign a flow to the frame. Each unique flow is assigned a tag. A table of flows and their corresponding tags are stored in the tag assignment table 30. Note that the invention can be implemented using a cache due to the locality of time and space.

When a flow is identified from the header, the tag assignment table 30 is checked whether the flow already exists in the table 30. If so, the associated tag is read from the table and appended to the frame. The frame and appended tag are output to the switching fabric via the switching fabric interface 24.

If the tag processor does not find the flow in the tag assignment table 30, the header is transmitted to the switch controller via the switch controller interface 32. The switch controller functions to assign both a flow and a tag as represented by a flow ID and a tag ID for the new flow. The flow ID and tag ID are transmitted back to the tag processor 28 in the I/O processing unit 12. Upon receipt, the new flow ID and tag ID are placed in a new record, i.e., line, in the tag assignment table 30. The flow description is made up of a header value and a mask bit map. The flow ID functions as an identifier or label of the flow.

The contents of the tag assignment table may be represented by the following elements shown in Table 1 below.

TABLE 1

Contents of the Tag Assignment Table

| Flow | Flow Description | Tag |
|---|---|---|
| Flow #1 | Flow Description #1 | Tag #1 |
| • | • | • |
| • | • | • |
| • | • | • |
| Flow #N | Flow Description #N | Tag #N |

Note that the process of assigning a new flow and tag are performed only once the first time a unique flow is detected. After the first frame, the tag is retrieved from the tag assignment table 30.

Thus, frames always leave the I/O processing unit with a tag appended to them. The switch controller, however, may be needed to assign a new flow ID and tag ID to a flow that is not currently in the tag assignment table 30.

The controller 26 performs various functions including administration, management and control of the elements making up the I/O processing unit 12. In addition, the I/O processing unit 12 may communicate command, instructions and status to and from a host computer.

Figure 3:
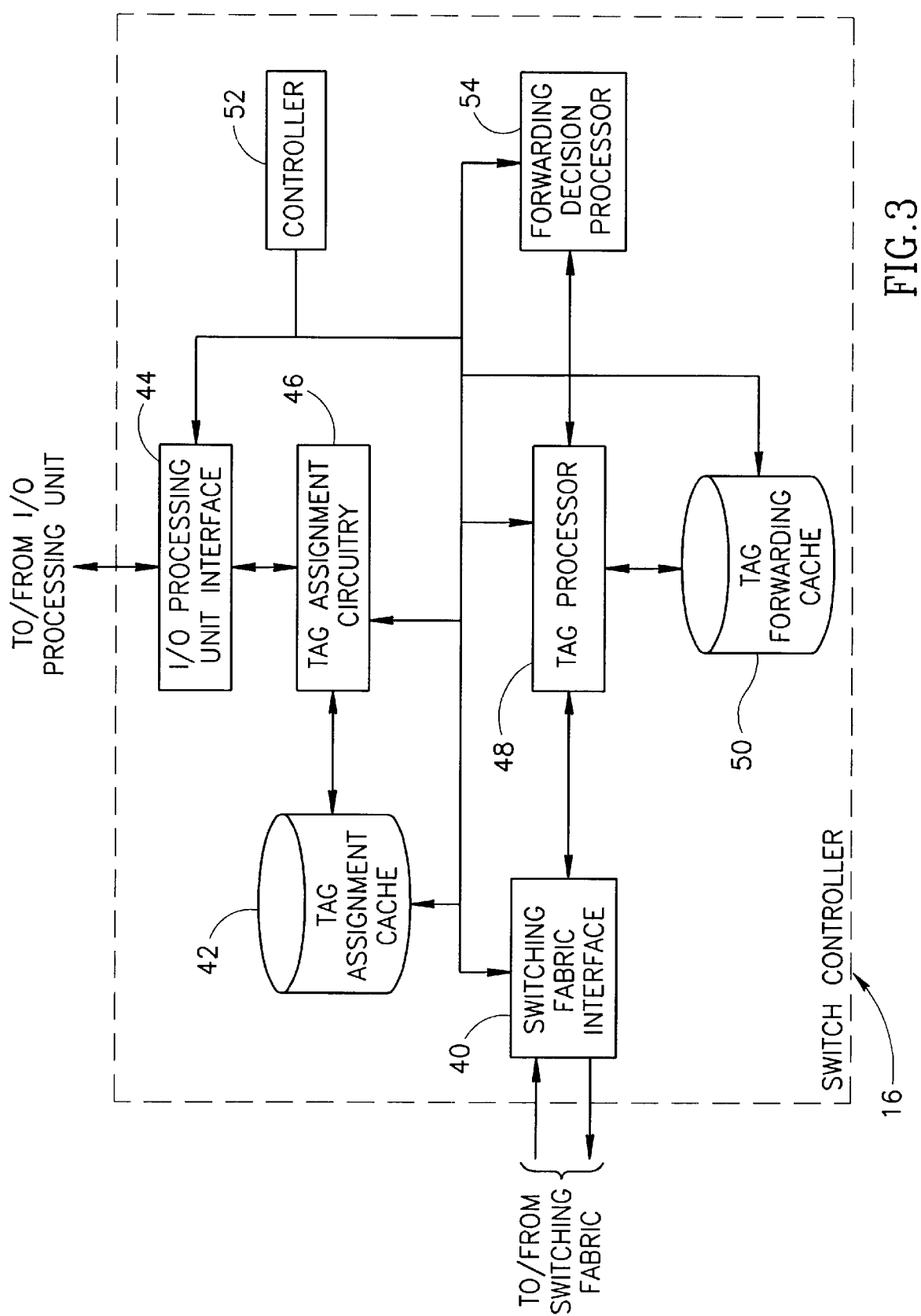
FIG. 3 is a block diagram illustrating the switch controller of the first embodiment of the present invention in more detail.

A block diagram illustrating the switch controller of the first embodiment of the present invention in more detail is shown in FIG. 3. The switch controller, generally referenced 16, comprises a switching fabric interface 40, I/O processing interface 44, tag assignment circuitry 46, tag assignment cache 42, tag processor 48, forwarding decision processor 54, tag forwarding cache 50 and controller 52.

As described previously, the I/O processing unit is operative to transmit frame header information to the switching controller in the event an entry for a particular flow is not found in the tag assignment table 30 (FIG. 2). The frame header information is received by the tag assignment circuitry 46 via the I/O processing unit interface 44. The tag assignment circuitry 46 is operative to analyze the flow and check for its existence in the tag assignment cache 42. If it is not found, a new flow ID and corresponding tag ID is assigned, placed in the tag assignment cache 42 and transmitted back to the I/O processing unit.

Once a flow ID and tag ID have been assigned and the tag has been appended to the frame, the I/O processing unit transmits the frame to the switching fabric. The switching fabric is operative to transmit the frame header to the switch controller. The switch controller returns the forwarding decision to the switching fabric and the frame is subsequently forwarded to the appropriate port.

In operation, the frame header is input to the tag processor 48 via the switching fabric interface 40. The tag processor 48 is operative to first check for the existence of an entry in the tag forwarding cache 50. The tag information is used as the index to the cache 50. The cache functions to store previously calculated forwarding decisions, thus obviating the need to recalculate the decision for frames belonging to the same flow.

If an entry corresponding to the tag is found in the tag forwarding cache 50, the forwarding decision corresponding to the tag is read from the cache and transmitted to the switching fabric for use in determining the appropriate output port to forward the frame to. If the tag is not found in the tag forwarding cache 50, the frame header information is sent to the forwarding decision processor 54 which functions to calculate a forwarding decision based on the contents of the frame header. Note that the forwarding decision processor 54 may be implemented either in hardware or software. Typically, it is implemented in software due to the potential complexity of calculating the forwarding decision. Note that the process of generating a new forwarding decision is performed only once for the first frame in a flow. After the first frame, the forwarding decision is retrieved from the tag forwarding cache 50.

The contents of the tag forwarding cache may be represented by the following elements shown in Table 2 below.

TABLE 2

Contents of the Tag Forwarding Cache

| Tag | Forwarding Data | New Header |
|---|---|---|
| Tag #1 | Forwarding Data #1 | New Header #1 |
| ... | ... | ... |
| Tag #N | Forwarding Data #N | New Header #N |

Note that the forwarding decisions may, for example, comprise a list of output ports the frame is to be forwarded to. The new header is substituted for the old header upon the frame being forwarded to the output port.

The controller 52 performs various functions including administration, management and control of the elements making up the switch controller 16. In addition, the switch controller 16 may communicate command, instructions and status to and from a host computer.

Note that the processing of frames are delayed when flows corresponding to input frames are not found in the tag assignment table 30 (FIG. 2) and the frame header must be sent to the switch controller in order to have a flow ID and tag ID assigned. In addition, frames that arrive after the first frame associated with a new flow must be buffered. This is due to the delay in forwarding the header to the switch controller and waiting for a reply which comprises a newly assigned flow and tag.

Second Embodiment: Tag Assignment by I/O Processing Unit

Figure 4:
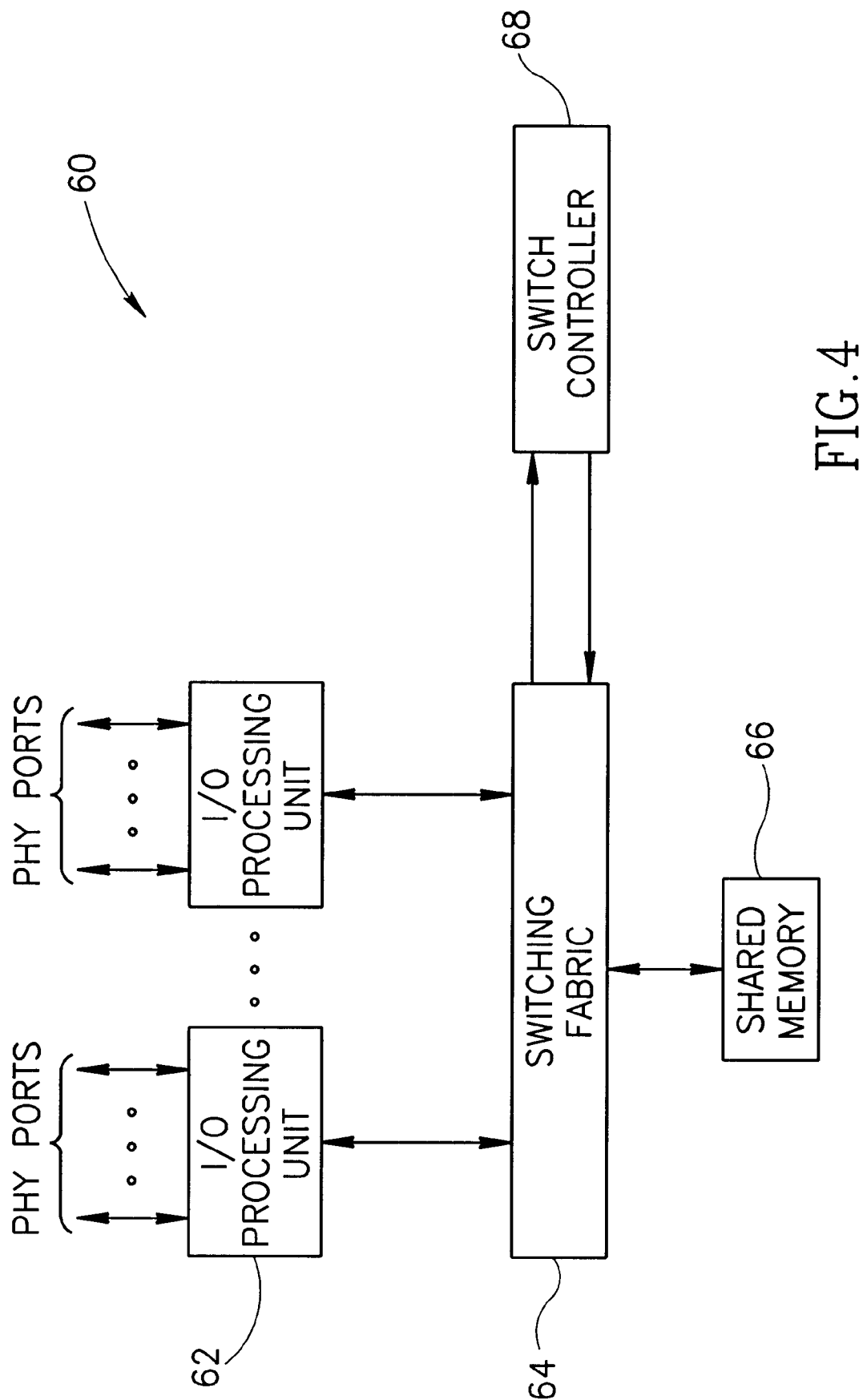
FIG. 4 is a block diagram illustrating a second embodiment of the flow switching apparatus of the present invention.

The second embodiment will now be described in more detail. A block diagram illustrating a second embodiment of the flow switching apparatus of the present invention is shown in FIG. 4. The flow switching apparatus, generally referenced 60, comprises a plurality of I/O processing units 62 coupled to a switching fabric 64. The switching fabric 64 is coupled to the switch controller 68. The switching fabric 64 utilizes and communicates with shared memory 66. Each of the I/O processing units 62 is coupled to one or more PHY (physical layer) ports. Note that the shared memory is optional and can be replaced with any other suitable type of memory and may be integrated within the switching fabric itself or left out completely in cases where the switching fabric does not utilize memory.

Similar to the apparatus of FIG. 1, the flow switching apparatus 60 may be implemented as part of a network switch or other network element. An example is an Ethernet switch that is capable of communication over a variety of data formats and speeds. For example, I/O processing units 62 may be adapted to communicate with standard Ethernet (10 BaseT), Fast Ethernet (100 BastT), Gigabit Ethernet (1000 BaseT) or ATM signals. In addition to providing Layer 2 switching, the network switch may also be adapted to provide support for VLANs, bridging, LANE, MPOA, etc.

In operation, the I/O processing units 62 convert the various types of input data, e.g., Ethernet, Fast Ethernet, ATM, etc., into a universal common format. The frames are input to the switching fabric 64 where they are forwarded to the appropriate output port. The switching fabric 64 utilizes the shared memory 66 to temporarily store the input frames during the forwarding process. The forwarding decisions are not made by the switching fabric 64 but by the switch controller 68. The switch controller 68 receives a portion of the frames including the header, and makes forwarding decisions based upon selected criteria.

A key difference between the apparatus 60 of the second embodiment and that of the apparatus 10 of the first embodiment, is that the assignment of flows and associated tags is performed by the I/O processing units without the need to transmit the header information to the switch controller. This eliminates the delay associated with the requirement of sending the switch controller the header information and waiting for a response therefrom.

The I/O processing unit 62 is operative to transmit the flame in the universal frame format with the tag appended thereto. This speeds the processing by performing the assignment of flows and tags to the incoming frames within the I/O processing unit itself. As described in more detail hereinbelow, the switch controller utilizes a primary and a secondary cache to store tags and previously calculated corresponding forwarding decisions. Using the tag as an index to a cache, the forwarding decision is read from the cache without the need to re-calculate it.

Figure 5:
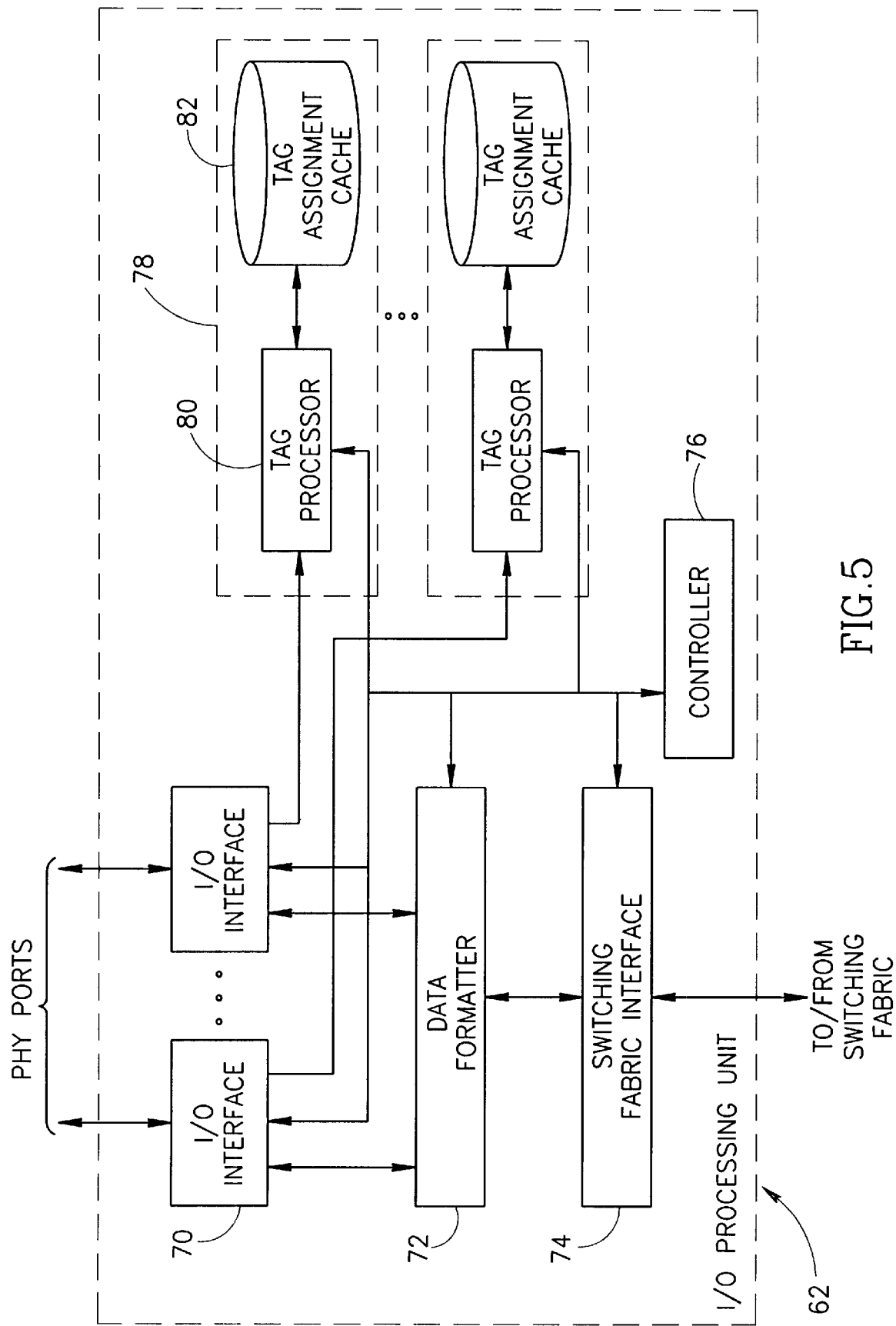
FIG. 5 is a block diagram illustrating the I/O processing unit of the second embodiment of the present invention in more detail.

The I/O processing unit 62 will now be described in more detail. A block diagram illustrating the I/O processing unit of the second embodiment of the present invention in more detail is shown in FIG. 5. The I/O processing unit 62 comprises a plurality of I/O interfaces 70, a data formatter 72, switching fabric interface 74, a plurality of tag processing circuits 78 and controller 76.

One of the functions of the I/O processing unit 70 is to identify unique flows from the frames received from the ports. For each unique flow identified, a unique tag is assigned and appended to the frame. Once a tag is assigned, subsequent frames that match the flow are assigned the corresponding tag. The tag is appended to the frame and later used in the switch controller as an index for lookup purposes to determine the forwarding decision to use for the frame.

Each I/O interface, i.e., individual port, has associated with it dedicated tag processing circuitry 78. Each tag circuit comprises a tag processor 80 and a tag assignment cache 82. Alternatively, a central tag processor can provide tag processing to all the ports. Likewise, a centralized common tag assignment cache can be implemented in place of a separate tag assignment cache associated with each tag processor.

Each frame that is received by the I/O processing unit via the I/O interface 70 is analyzed by its associated tag processor 80. The tag processor 80 analyzes the frame header and identifies the flow. Once identified, the tag processor searches the tag assignment cache for an entry. If no entry is found, the tag processor assigns the new flow to a tag and stores the flow and associated tag in the tag assignment cache. An important feature of the present invention is that each tag processor, i.e., each port, is assigned a block of tags for use wherein the number of tags in the block is finite, e.g., 10, 100, 1000.

Thus, the number of unique flows that can be defined at any one time is limited to the number of tags in the block. Thus, for example, considering a block of 10 tags, up to 10 flows can be defined at any one point in time. When the eleventh flow is received, one of the ten flows already defined is reused (recycled). To prevent confusion when a tag is reused and existing frames with the reused tag are present in a queue, a bit denoted the new_tag_bit is set. This bit is set only for the first frame of a new flow when it is assigned a tag.

In addition, the port number corresponding to the particular input port can be used as part of the tag. This serves as a simple method of guaranteeing the uniqueness of each tag assigned.

When a flow is identified from the header, the tag assignment table 82 is checked whether the flow already exists. If so, the associated tag is read from the table and appended to the frame. The frame and appended tag are output to the switching fabric via the switching fabric interface 74.

Note that the identification of flows by the input port is performed in a distributed manner. Each individual port performs the identification that can be executed very quickly wherein the input port apparatus is scaled to match the port speed. The flow identification can be performed in hardware using one or more mask bits. Tho frame header is compared using a simple comparator with the mask bits pre-set (if needed). The tag assignment cache used to hold the flows and associated tags can be relatively small but very fast Thus, each port supports a limited number of flows. Due to the nature of typical data communications i.e., locality of time and space, it is expected that most frames will generate a hit on the cache. This is especially so on ports connected to devices other than a server. Servers generally communicate with a multitude of users, thus creating fewer hits on the cache.

Optionally, an extra large tag assignment cache can be used on ports known to be connected to a server. Note that the server is a special device that may be adapted to generate its own tags and bypass the switch assignment. In such a configuration, the I/O portion of the switch will be configured not to assign a tag, i.e., transparent mode.

Note also that the caches associated with each individual port do not need to be coordinated as each is assigned a separate tag space. In operation, it is important that no two flows are assigned the same tag.

Thus, in contrast to the flow switching apparatus of the first embodiment the I/O processing unit of the second embodiment itself functions to identify and assign flows and tags to the receive frames. Note that flows can be defined using any suitable criteria that is discernable from the contents of the frame itself. Examples include defining flows based on IP source and/or destination address, MAC source and/or destination address, Class of Service (CoS), protocol type (ARP, HTTP, FTP), etc. In connection with CoS, even though the forwarding decision may be the same for two different frames, it may be desirable to assign two different levels of priority to the two frames in accordance with the CoS. Note also that we may define entries that are locked in related caches. In this case, one or more of the tags may be configured manually or otherwise to be permanent and fixed in the cache.

The contents of the tag assignment cache may be represented by the following elements shown in Table 3 below. The flow description is the contents of the flow itself while the flow ID functions as an identifier or label of the flow. The flow description is made up of a header value and a mask bit map. The flow ID functions as an identifier or label of the flow.

TABLE 3

Contents of the Tag Assignment Cache

| Flow ID | Flow Description | Tag |
|---------|------------------|-----|
| Flow #1 | Flow Description #1 | Tag #1 |
| . | . | . |
| . | . | . |
| . | . | . |
| Flow #N | Flow Description #N | Tag #N |

Note that the process of assigning a new flow and tag are performed only once the first time a unique flow is detected. After the first flow, the tag is retrieved from the tag assignment cache 82.

Thus, frames always leave the I/O processing unit with a tag appended to them. The switch controller is not needed to assign a new flow ID and tag ID to a flow that is not currently in the tag assignment table 30.

The controller 76 performs various functions including administration, management and control of the elements making up the I/O processing unit 62. In addition, the I/O processing unit 62 may communicate command, instructions and status to and from a host computer.

Figure 6:
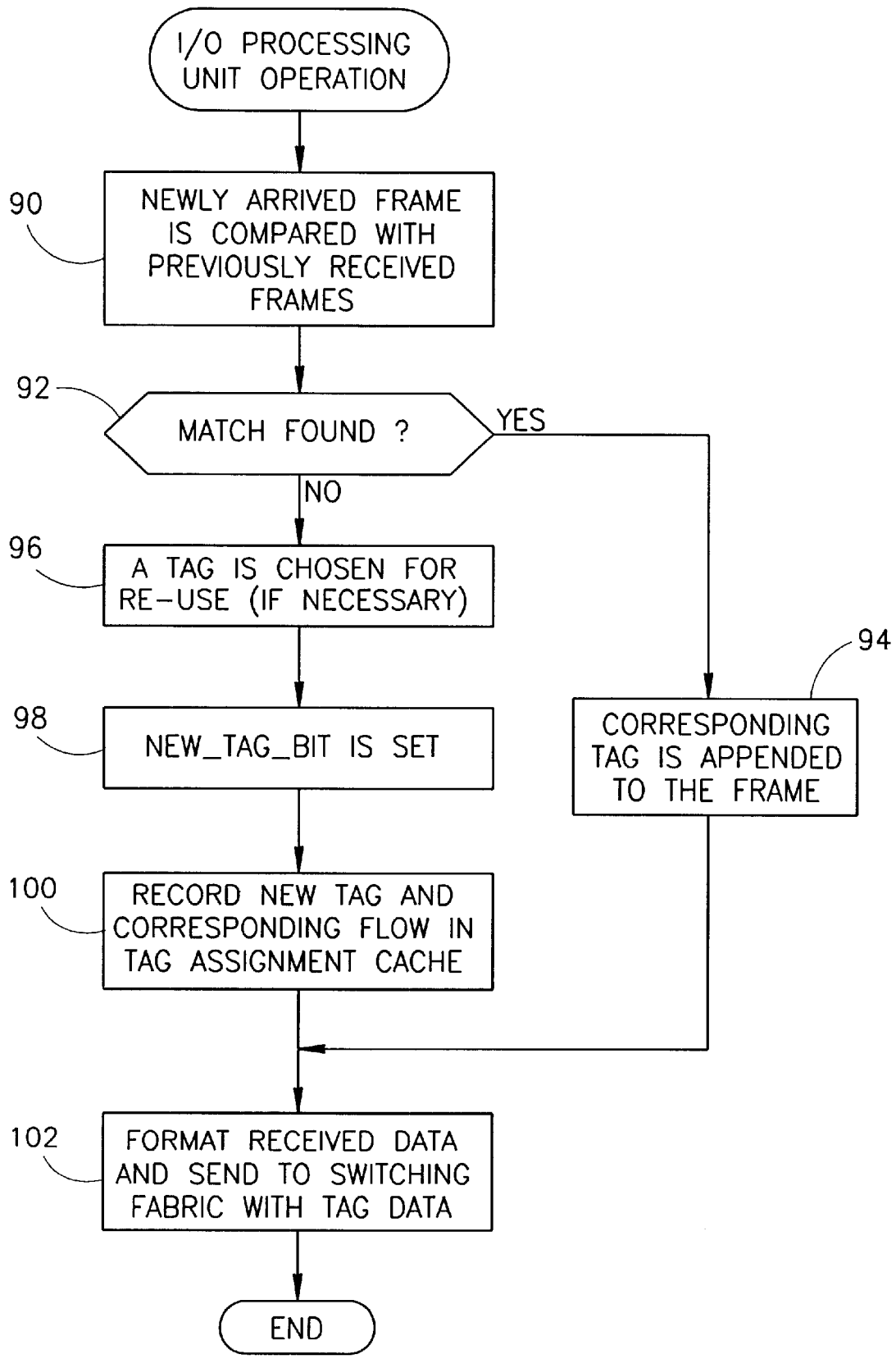
FIG. 6 is a flow diagram illustrating the operation of the I/O processing unit in more detail.

A flow diagram illustrating the operation of the I/O processing unit in more detail is shown in FIG. 6. First, a newly received frame is compared with previously received frames to determine whether it has been received before (step 90). If it has been received, the tag corresponding to the particular flow is read from the tag assignment cache (step 94). The frame is formatted with the tag appended thereto and transmitted to the switching fabric (step 102).

If the flow is not found in the tag assignment cache (step 92), a tag is assigned to the flow from the block of tags assigned to the particular port (step 96). If all the available tags are currently assigned to flows, a tag is selected and reused. Regardless of whether a tag is reused or not, when a tag is assigned to a new flow, the new_tag_bit is set and appended with the tag to the frame (step 98).

The flow and new tag assigned to the flow are recorded in the tag assignment cache (step 100). The frame is formatted, tag and new_tag_bit appended to the frame and the combination is transmitted to the switch controller (step 102).

Figure 7:
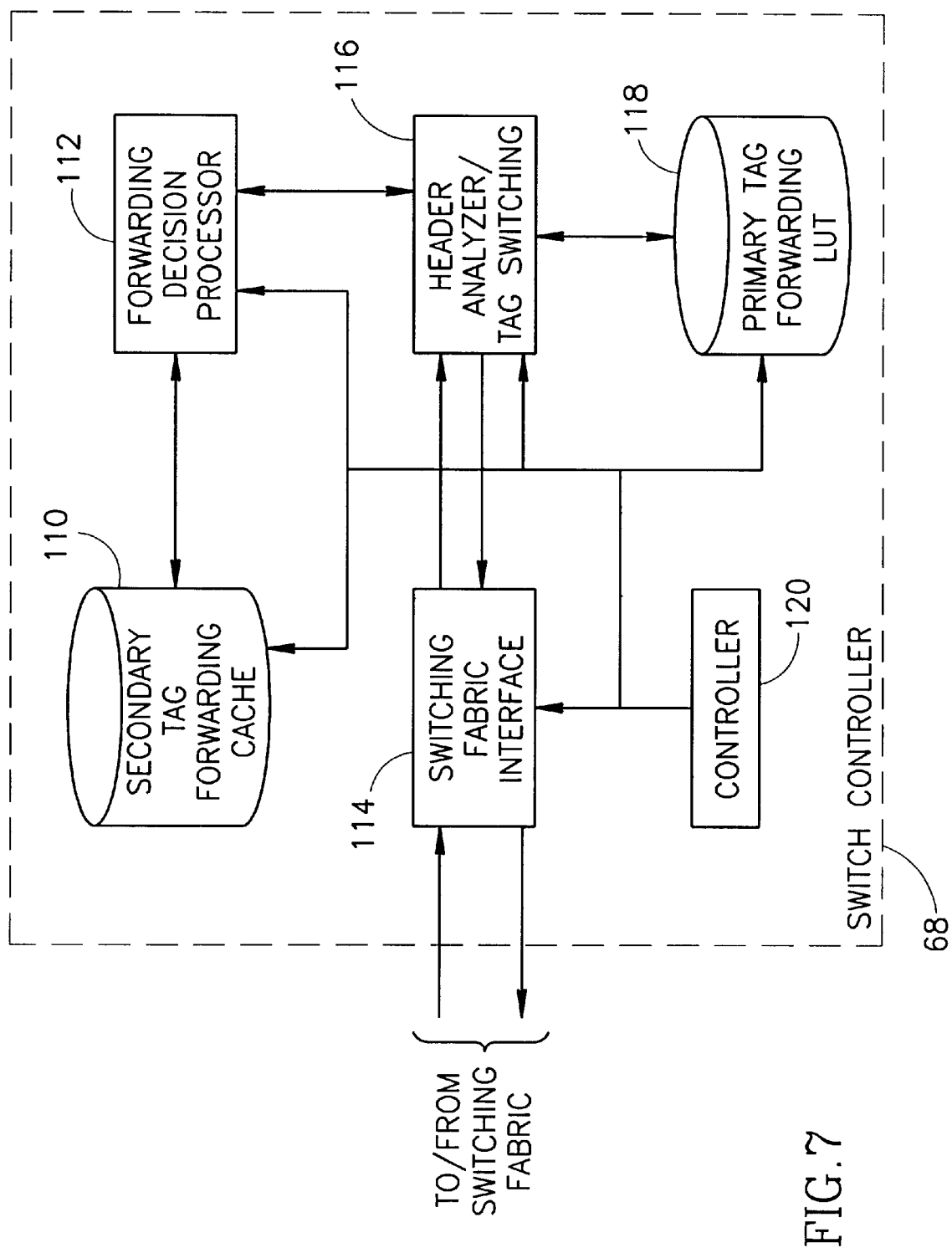
FIG. 7 is a block diagram illustrating the switch controller of the second embodiment of the present invention in more detail.

The switch controller will now be described in more detail. A block diagram illustrating the switch controller of the second embodiment of the present invention in more detail is shown in FIG. 7. The switch controller, generally referenced 68, comprises a switching fabric interface 114, header analyzer/tag switching unit 116, primary tag forwarding Look Up Table (LUT) 118, secondary tag forwarding cache 110, forwarding decision processor 112 and controller 120.

The switch controller is operative to perform the switching operation whereby a forwarding decision is calculated based on the contents of the header of each frame. Note that although the flow switching apparatus and method of the present invention is presented within the context of a switching fabric, it is not meant to be limited. The invention can be applied to any type of processing or function that is performed on the incoming frames.

In accordance with the invention, it is not necessary that the input port have any knowledge of the operation of the next stage, i.e., the next stage in this example being the switch controller. The next stage in general comprises the necessary intelligence to perform the intended function. Examples of an intelligent node functioning as the next stage include but are not limited to routing, bridging, NIC, edge device, etc. Thus, the I/O processing unit communicates with the intelligent node (e.g., the switch controller) which performs the desired function. Alternatively, the two functions, i.e., I/O processing unit and intelligent node, may be separated, physically located in different boxes or across a network. For example, in the networking context, an edge device or NIC may transmit frames with the tag appended over the network to a router that processes the frames.

Referring to the switch controller example disclosed herein, the intelligent node (i.e., the switch controller) makes a forwarding decision and provides the header to be substituted on the output of the incoming frame from the switching fabric.

In operation, the first frame to arrive contains a tag that is unknown to the switch controller. The frame and tag information is input to the header analyzer/tag switching unit 116 via the switching fabric interface 114. The header analyzer 116 is operative to analyze the header and tag and check for the existence of an entry with that tag in the primary tag forwarding LUT 118.

The primary tag forwarding LUT 118 comprises a very fast cache or memory look up table that holds tags and previously calculated forwarding decisions corresponding to them. If a hit occurs, i.e., the tag entry is found, the forwarding decision is read from the LUT 118. If the tag is not found in the LUT 118, as is the case the first time a tag is used or when the new_tag_bit is set in the header, the header is transferred to the forwarding decision processor 112. Note that the LUT preferably contains all the currently active nodes and thus needs to be as big as the sum of all the tag assignment caches in each I/O processor unit. Note that it is not mandatory that the size of the LUT be equal to or bigger than the aggregate sum of the tag assignment caches.

The forwarding decision processor 112 may be implemented in hardware and/or software and functions to perform the forwarding decision and header substitution based on the contents of the frame header. First, the forwarding decision processor 112 checks the contents of the secondary tag forwarding cache 110 for an entry corresponding to the tag. This cache may be implemented via the software and is preferably much bigger than the primary tag forwarding LUT 118.

If a hit occurs, the forwarding decision and header substitution are read from the secondary cache 110 and written into the primary tag forwarding LUT 118. If a hit does not occur, i.e., no entry for the tag, a new forwarding decision and header substitution must be calculated. Once generated, the forwarding decision processor 112 stores the forwarding decision results in both the secondary tag forwarding cache 110 and the primary tag forwarding LUT 118.

Once a forwarding decision is determined, the switch controller transmits the frame header with the new header substituted therein to the switching fabric. The switching fabric is operative to subsequently forward the frame to the appropriate output port.

Note that the primary tag forwarding LUT may be implemented using inexpensive conventional RAM rather than special and relatively expensive CAM. This is due to a key feature of the flow switching of the present invention whereby a relatively short length tag, e.g., 16 bits, is used to represent a flow and its corresponding forwarding decision rather than the lengthy frame header itself. The contents of both the primary tag forwarding LUT and the secondary tag forwarding cache may be represented by the following elements shown in Table 4 below.

TABLE 4

Contents of the Primary Tag Forwarding
LUT and the Secondary Tag Forwarding Cache

| Tag | Forwarding Data | New Header |
|---|---|---|
| Tag #1 | Forwarding Data #1 | New Header #1 |
| ⋮ | ⋮ | ⋮ |
| Tag #N | Forwarding Data #N | New Header #N |

Note that the forwarding decisions may, for example, comprise a list of output ports the frame is to be forwarded to. The new header is substituted for the old header upon the frame being forwarded to the output port.

The controller 120 performs various functions including administration, management and control of the elements making up the switch controller 68. In addition, the controller 120 may communicate command, instructions and status to and from a host computer.

Figure 8:
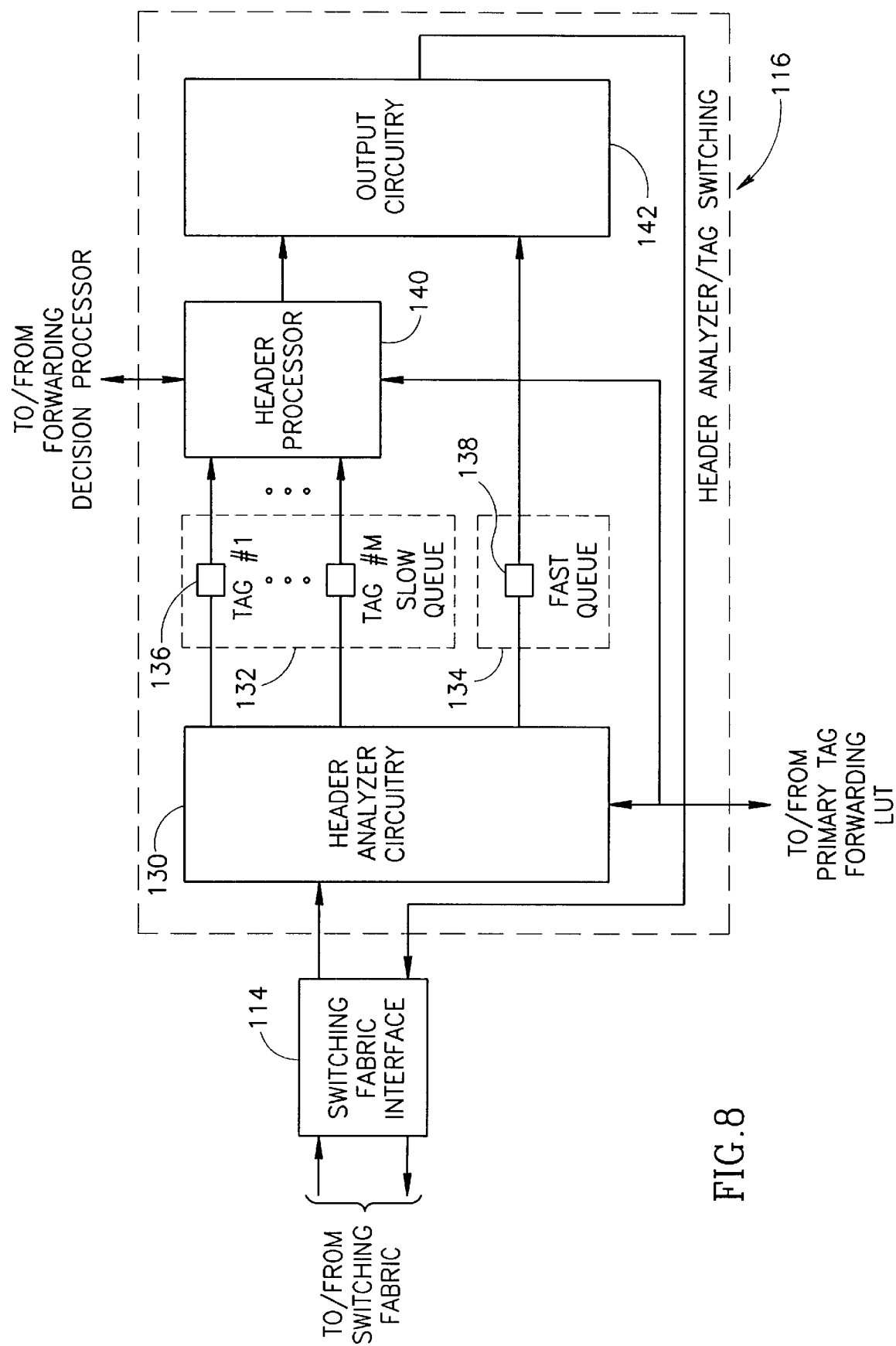
FIG. 8 is a block diagram illustrating the header analyzer/tag switching portion of the switch controller in more detail.

A block diagram illustrating the header analyzer/tag switching portion of the switch controller in more detail is shown in FIG. 8. The header analyzer/tag switching unit 116 comprises a header analyzer circuitry 130, a slow queue 132 comprising a plurality of M tag queues 136 labeled tag #1 through #N, a fast queue 134, header processor 140 and output circuitry 142. Optionally, an input queue (not shown) can be added to handle the case when all M slow tag queues are occupied. Preferably, CAM memory is used for the M tag queues 136 to facilitate the management of the queues.

In operation, the switching fabric 64 passes the frame headers to the header circuitry 130 via the switching fabric interface 114. The tag appended to the header is read and the primary tag forwarding LUT 118 is searched for a match. If it is found, the corresponding forwarding decision data is placed on the fast queue 138 where it is subsequently processed by the output circuitry 142.

If a match is not found, the header with tag is placed in the slow queue 132 in a tag queue 136 that is used for that particular tag only. Eventually, the header processor 140 reads the slow queue and attempts to forward the frame using conventional means within the header processor including looking in a forwarding database for a match on the destination address.

It is important to note that the present invention attempts to overcome the disadvantages of using a conventional forwarding database technique by the assignment of tags to frames. Using tags obviates the necessity of using a forwarding database and performing a lookup on the destination address which may be 48 bits long, versus looking up a 16 bit tag value.

If the frame cannot be forwarded using conventional forwarding techniques, the header processor sends the header and tag to the forwarding decision processor 112 which in turn searches the secondary tag forwarding cache 110 for an entry matching the tag.

If a match is found, the corresponding forwarding decision data is passed to the header processor 140 which inputs the header to the output circuitry 142 and writes the tag and corresponding forwarding decision data in the primary tag forwarding LUT 118.

If a match is not found, the forwarding decision processor calculates a new forwarding decision and writes the results with the associated tag in both the primary tag forwarding LUT 118 and the secondary tag forwarding cache 110.

The output circuitry functions to generate the new header and transmit it to the switching fabric which substitutes it for the existing header before output the frame to the destination port.

When a forwarding decision has been calculated, all the frames associated with the particular tag in the tag queue are switched at the same time. Depending on the implementation of the queues, the frames may be switched by pointer manipulation.

Note that if the header and tag were placed on the slow queue and the processing can be performed in hardware, e.g., a new flow that required a bridging function, internal routing, etc., then the primary tag forwarding LUT 118 is updated via hardware and the frame is placed in the fast queue. In this case, the secondary cache may be updated as well using a process run in the background.

In accordance with the invention, the processing, e.g., switching, of the incoming frames can be performed very quickly when the hit ratio is very high. In typical network traffic scenarios, it is anticipated that a LUT or cache hit occur most of the time, while the software would only be required to calculate a new forwarding decision at the beginning of a new flow.

Note that the tag allocation apparatus of the present invention is operative to prevent circulation of a tag again and again with the tag associated with different flows at different times. Circulation may occur since the primary and secondary caches are preferably super sets of the tag assignment caches in each input port. Thus, it is possible that an input port will recycle (re-circulate) a tag that was previously allocated while the tag still is in the primary and/or secondary cache and/or any of the queues.

To overcome this problem, as described hereinabove, the invention provides for a new_tag_bit in the tag which is set when a tag is used for the first time with a new flow. When the new_tag_bit is set, it forces the frame to be loaded into the slow queue within the switch controller. When this occurs, the existing entries in the primary tag forwarding LUT 118 and the secondary tag forwarding cache 110 corresponding to the new tag are deleted before the tag is stored.

Note that without the use of the slow queue a potential bottleneck may arise whereby misses in the primary and secondary cache cause the software to calculate a forwarding decision frequently causing delays in the flow of frames. The slow queue overcomes this problem whereby headers and tags are queued according to the value of the tag.

Subsequent frames with the same tag are placed in the queue behind the previously received frame with the same tag. Eventually the software calculates the forwarding decision and at that time, all the frames queued in the particular tag queue are switched together at one time to the output circuitry. Switching multiple frames at a time compensates for the delay of the software calculation.

Figure 9A:
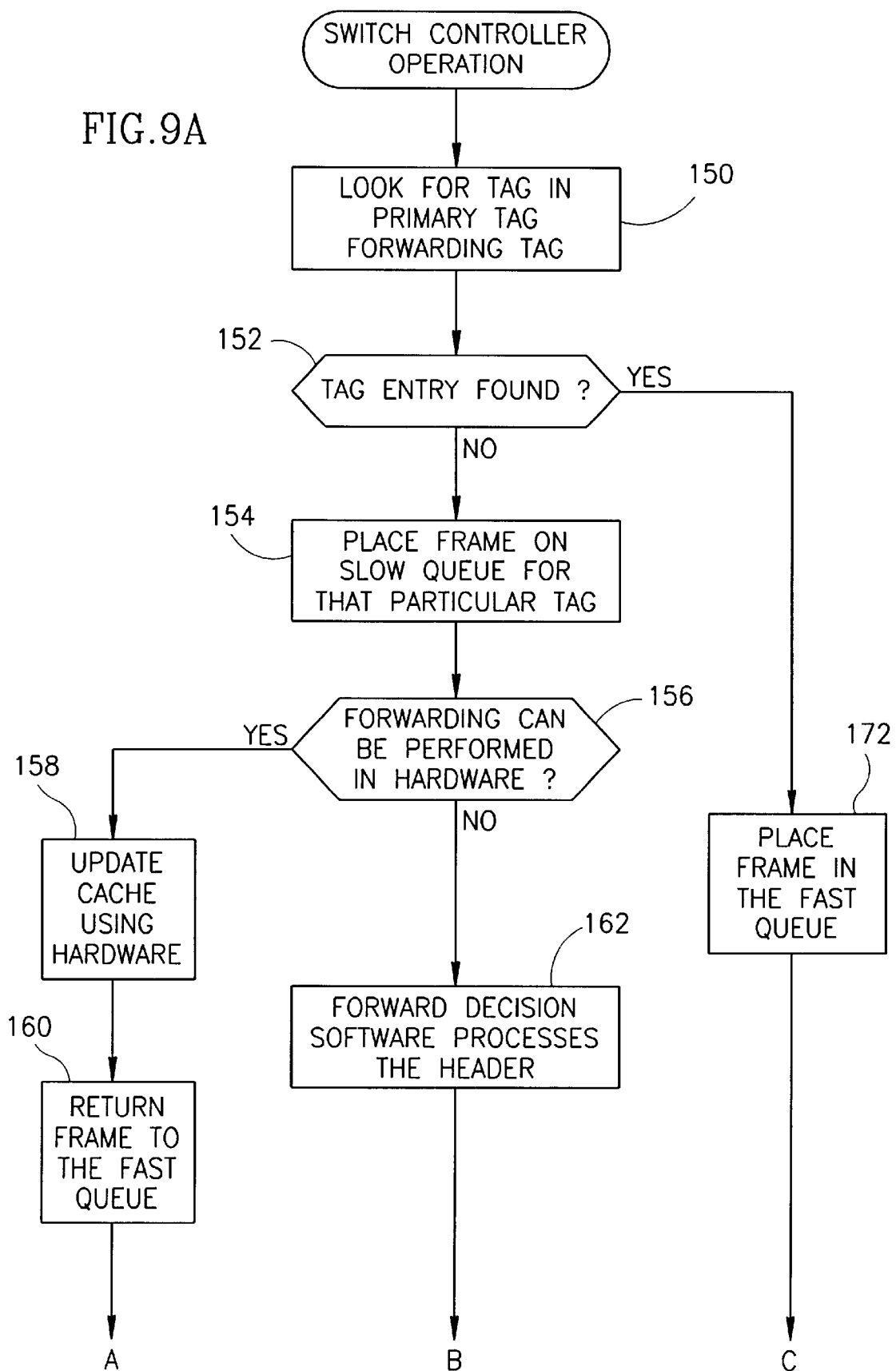
FIGS. 9A and 9B are a flow diagram illustrating the operation of the switch controller in more detail.
Figure 9B:
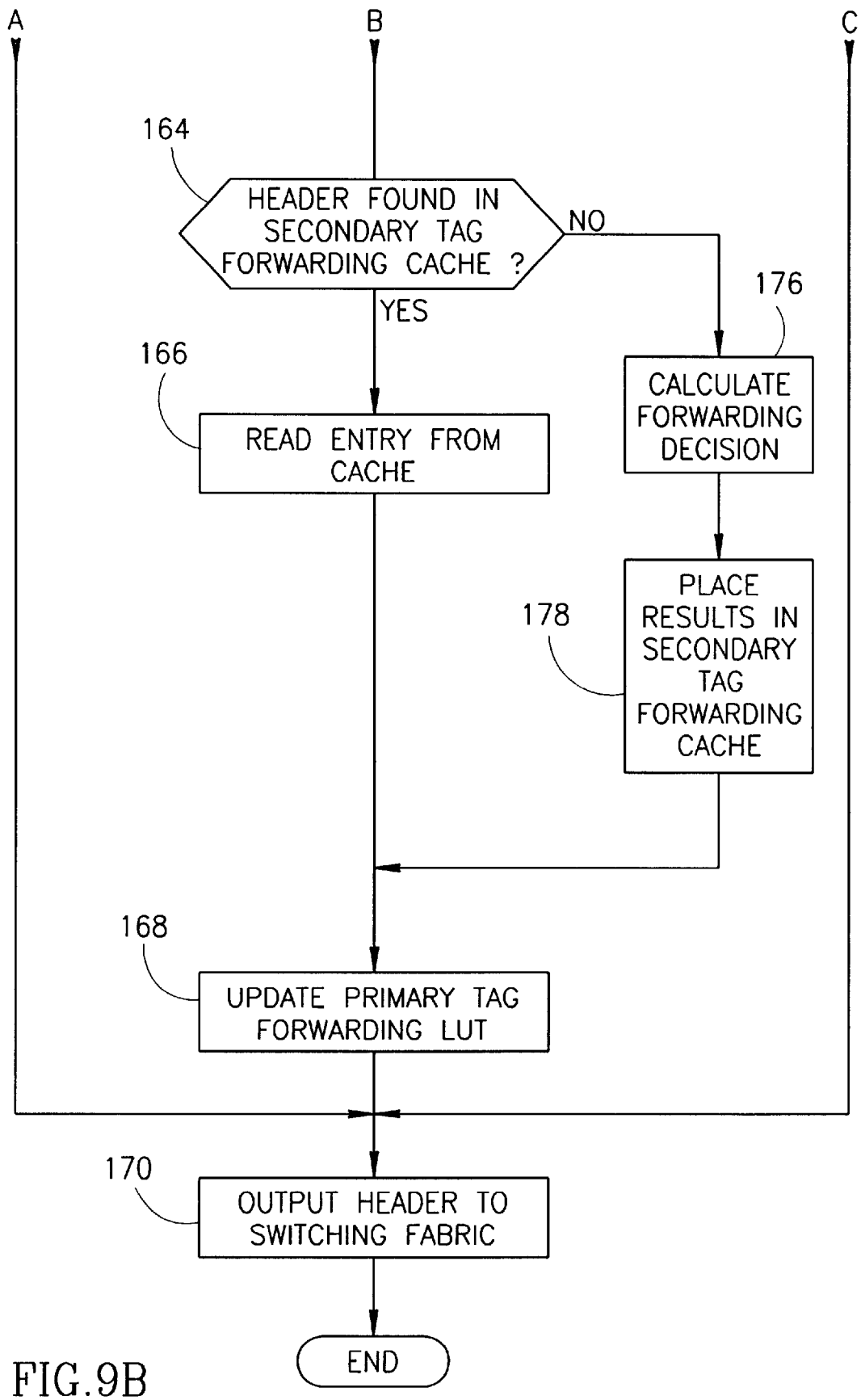

A flow diagram illustrating the operation of the switch controller in more detail is shown in FIGS. 9A and 9B. Headers with the tag appended thereto are received by the header analyzer which functions to search for the tag in the primary tag forwarding LUT (step 150). If the tag entry is found (step 152) the frame is placed in the fast queue (step 172), a new header is generated and output to the switching fabric (step 170).

If a match was not found (step 152), the frame is placed in the slow queue in a tag queue assigned to that particular tag (step 154). If the forwarding can be performed in hardware, e.g., bridging, etc., (step 156), the cache is updated using the hardware (step 158) and the frame is returned to the fast queue (step 160). A new header is generated and output to the switching fabric (step 170) and optionally placed in the secondary cache, i.e., software cache.

If the forwarding cannot be performed by the hardware (step 156), the forwarding decision processor (typically implemented in software) receives the header for processing (step 162). If the tag is found in the secondary tag forwarding cache (step 164) the corresponding forwarding data is read from the cache (step 166) and the primary tag forwarding LUT is updated (step 168).

If the tag was not found in the secondary tag forwarding cache (step 164), the software calculates a new forwarding decision for the flow (step 176) and the results are placed in the secondary tag forwarding cache (step 178). The primary tag forwarding LUT is also updated (step 168) and a new header is generated and output to the switching fabric (step 170).

Note that the assignment of blocks of tags to input ports is easily done when the input ports are located within the same box or chassis. When the input ports span multiples boxes, it must be assured that the blocks of tags assigned to the input ports on one box do not overlap those assigned to input ports on another box. Thus, a suitable mechanism must be defined to negotiate tag space such that two flows do not use the same tag.

Such a mechanism may comprise allocating portions of the tags based on input port number. The following is an example of the contents of the tag whereby the port number is incorporated in the tag. In this example, tags comprise 16 bits.

TABLE 5

Tag Structure

| Bit(s) | Definition |
|---|---|
| 1 | New tag bit |
| 2–8 | Port number |
| 9–15 | Tag assigned by I/O processor |

Thus, the present invention provides a tag switching (or flow switching) function that performs several functions including (1) calculating a forwarding decision, (2) providing the actual data movement of the frame or packet and (3) manipulation of the header, i.e., header substitution. Note that a key feature of the invention is that tags are dynamically assigned in a manner that is independent of other entities in the network, i.e., without communications between network entities.

Thus, in a network with an end to end connection, using the present invention, there is no need for the two endpoints to be coherent. If one end of the connection does not have a tag, the network element recalculates the forwarding decision and substitute header.

Third Embodiment: Simultaneous Tag Processing Among Network Entities

In a third embodiment, the functions performed by the I/O processor and switch controller are performed by separate boxes, i.e., separate network entities. In this case, one entity functions to assign and append a tag to the frame while another entity functions to calculate and relate a forwarding decision to the tag. From that point in time onward, the same forwarding decision and substitute header apply.

Not that alternatively the two boxes may be the same whereby each is a forwarding entity that performs forwarding as well as assignment and appending of tags for the next hop.

Just as multiple external network entities can function to implement the tag assignment, forwarding based on tag contents and data movement functions of the invention in a distributed fashion, the invention can be applied to multiple circuit cards inside a single network entity. In other words, each circuit card can be adapted to perform the functions of tag assignment, frame forwarding based on tag contents and data movement within the card itself wherein the assignment of tags is independent from circuit card to circuit card.

Further, the invention can be implemented on some entities in a network but not on others. A network may comprise any number of and combinations of entities that include hops wherein the tag is missing thus causing the next hop to recalculate the forwarding decision. Every frame comprises information required to make a forwarding decision in addition to the tag itself. Preferably, each node in the network is able to make the forwarding decision on its own. Utilizing the tag, however, facilitates this process.

For example, Layer 2 and Layer 3 switches can both be used simultaneously in the network. In addition, each switch may or may not implement the flow switching apparatus and method of the present invention. Assignment of tags in the network entities that do support the invention, is done on a dynamic basis on the fly. A switch or other entity, may or may not strip the tag off the frame as it arrives, as long as the tags assigned are unique and serve to identify similar frame headers.

Further, on any individual network entity, i.e., node, tag space is optionally assigned to a particular port. Individual tag spaces are not required to be assigned to individual ports as long as the receiving node is able to distinguish all the incoming flows from all input ports. Thus, similar tags are assigned to different flows since the assignment of tags is based on the port number. The use of the port number makes similar tag assignments unique thus simplifying the process.

In addition, the flow switching apparatus and method of the present invention can be applied to both signaling based networks, e.g., ATM, and network that do not use signaling to setup call connections. In networks where no signaling is used to setup connections, each frame must contain all the routing information and Class of Service (CoS) needed by each node.

For example, the present invention allows for the setting up of connections without the use of signaling in an ATM network provided that each ATM cell belonging to a particular frame is assigned the same tag, i.e., VPI/VCI pair. In this case, any ATM node in the network can setup a connection on the fly for any new tag as it arrives.

While the invention has been described with respect to a limited number of embodiments, it will be appreciated that many variations, modifications and other applications of the invention may be made.

What is claimed is:

1. A method of switching data utilize tags for use in a network device, said method comprising the steps of:
    providing a tag assignment cache for storing previously received flows and tags corresponding thereto;
    determining a current flow from a header portion of a received frame and comparing said current flow with recently received flows stored in said tag assignment cache;
    if a match is found, reading a tag from said tag assignment cache corresponding to said current flow, and if a match is not found randomly choosing a tag from a pool of unused tags and associating it with said current flow and storing said current flow and said tag in said tag assignment cache;
    in the event no unused tags are available, selecting a tag for reuse and setting a new-tag-bit in the received frame only for the first frame of said current flow:
    appending said tag to said received frame;
    providing a tag forwarding cache for storing forwarding decisions and corresponding tags;
    for each new flow received, calculating a forwarding decision and substitute header and storing the results of said forwarding decision, substitute header and the tag associated therewith in said tag forwarding cache;
    for frames of a flow other than the first, retrieving a forwarding decision and substitute header from said tag forwarding cache based on the tag appended to said received frame;
    applying said forwarding decision and substitute header to said received frame to produce an output frame; and
    forwarding said output frame with said substitute header to the appropriate output port in accordance with the forwarding decision corresponding thereto.

2. The method according to claim 1, wherein said steps of identifying and assigning are performed independently of and without any communications required to other network entities.

3. The method according to claim 1, wherein said tag forwarding cache comprises:
    a primary tag forwarding cache implemented in hardware; and
    a secondary tag forwarding cache implemented in software adapted to operate at a slower speed than said primary tag forwarding cache.

4. The method according to claim 1, wherein each flow comprises the frame header or portions thereof that embody the criteria for identifying the particular flow.

5. The method according to claim 1, wherein said tag assignment cache comprises records containing fields representing a flow ID, flow description and tag assignment.

6. The method according to claim 1, wherein said tag forwarding cache comprises records containing fields representing a tag ID, forwarding data and substitute header.

7. The method according to claim 1, further comprising the step of providing a third cache adapted to store the results of forwarding decisions and their associated tags, said third cache having a number of entries at least equal to the aggregate sum capacity of said tag assignment cache associated with a plurality of input ports, and whereupon a miss in said tag forwarding cache causes said forwarding decision to be retrieved from said third cache upon a hit on said tag.

8. The method according to claim 1, further comprising the steps of:
    storing incoming frames in one of a plurality of slow queues in the event a frame generates a miss on said tag forwarding cache requiring the calculation of a forwarding decision, each said slow queue associated with a separate tag; and
    forwarding all frames within a slow queue at one time once a forwarding decision has been calculated for the flow corresponding to the frames.

9. A method of switching data utilizing tags for use in a network device, said method comprising the steps of:
    providing a first cache for storing previously received flows and tags corresponding thereto;
    identifying flows on an input port of said network device by comparing the flow corresponding to a received frame with the flows of a limited number of recently received flumes received by said input port;
    searching for a matching flow in a said first cache and reading the tag corresponding thereto in the event of a cache hit, and randomly assigning a tag from a pool of unused tags and storing said tag and corresponding flow in said first cache in the event of a cache miss;
    in the event unused tags are available, selecting a tag for reuse and setting a new-tag-bit in the received frame only for the first fame of said flow:
    appending said tag to said received frame;
    providing a second cache for storing forwarding decisions and corresponding tags;
    for each new flow received, calculating a forwarding decision for the flow, and storing the results of said forwarding decision and the tag associated therewith in said second cache;

for frames of a flow other than the first, retrieving a forwarding decision from said second cache based on the tag appended to said received frame; and forwarding the data frame to the appropriate output port in accordance with the forwarding decision corresponding thereto.

10. The method according to claim 8, wherein said steps of identifying and assigning are performed independently of and without any communications required to other network entities.

11. The method according to claim 9, wherein each flow comprises the frame header or portions thereof that embody the criteria for identifying the particular flow.

12. The method according to claim 9, wherein said first cache comprises records containing fields representing a flow ID, flow description and tag assignment.

13. The method according to claim 9, wherein said second cache comprises records containing fields representing a tag ID, forwarding data and substitute header.

14. The method according to claim 9, further comprising the step of providing a third cache adapt to store the results of forwarding decisions and their associated tags, said third cache having a number of entries at least equal to the aggregate sum capacity of said first caches in each of said plurality of input ports, and whereupon a miss in said second cache causes said forwarding decision to be retrieved from said third cache upon a bit on the tag.

15. The method according to claim 9, further comprising the steps of:

storing incoming frames in one of a plurality of slow queues in the event a frame generates a miss on said second cache requiring the calculation of a forwarding decision, each said slow queue associated with a separate tag; and forwarding all frames within a slow queue at one time once a forwarding decision has been calculated for the flow corresponding to the frames.

16. A tag switching apparatus for use in a network device, comprising:

an I/O processor comprising a plurality of input ports, each input port comprising:

a first cache for storing tags and flows associated therewith;

a tag processor adapted to:

determine a current flow from a header portion of a received frame and compare said current flow with recently received flows stored in said tag assignment cache;

if a match is found, reading a tag from said tag assignment cache corresponding to said current flow;

if a match is not found randomly choosing a tag from a pool of unused taps and associating it with said current flow and storing said current flow and said tag in said tag assignment cache;

in the event no unused tags are available, selecting a tag for reuse and setting a new-tag-bit in the received frame only for the first frame of said current flow;

appending said tag to the received frame;

a controller comprising:

a second cache for storing forwarding decisions and corresponding tags;

a forwarding decision associated with a tag upon a miss in;

a header processor adapted to:

for each new flow received, calculate a forwarding decision for the flow associated with a tag and store the results of said forwarding decision and the tag associated therewith in said send cache, said header processor adapted; and for frames of a flow other than the first, retrieve a forwarding decision from said second cache based on the tag appended to said received frame.

17. The apparatus according to claim 16, further comprising a switching fabric adapted to forward data frames to their appropriate output port in accordance with the forwarding decision corresponding thereto.

18. The apparatus according to claim 16, wherein said second cache comprises a cache implemented using hardware.

19. The apparatus according to claim 16, further comprising a third cache adapted to store the results of forwarding decisions and their associated tags, said third cache having a number of entries at least equal to the aggregate sum capacity of said fir caches in each of said plurality of input ports, and whereupon a miss in said second cache causes said forwarding decision to be retrieved from said third cache upon a hit on said tag.

20. The apparatus according to claim 16, wherein each flow comprises the frame header or portions thereof that embody the criteria for identifying the particular flow.

21. The apparatus according to claim 16, wherein said first cache comprises records containing fields representing a flow ID, now description and tag assignment.

22. The apparatus according to claim 16, wherein said second cache comprises records containing fields representing a tag ID, forwarding data and substitute header.

23. The apparatus according to claim 16, further comprising a plurality of slow queues for storing incoming frames in the event a frame generates a miss on said second cache requiring the calculation of a forwarding decision, each said slow queue associated with a separate tag, and once a forwarding decision has been calculated for the flow corresponding to the frames, all frames within a slow queue are forwarded at one time.

24. The apparatus according to claim 16, wherein said I/O processor and said controller are implemented in the same network entity.

25. The apparatus according to claim 16, wherein said I/O processor and said controller are implemented in separate and independent network entities.

26. The apparatus according to claim 16, wherein said header processor comprises means for forwarding based on a forwarding database lookup in the event of a miss on said second cache.

27. The apparatus according to claim 16, wherein said header processor comprises a third cache comprising tags and associated forwarding decisions which is checked in the event of a miss on said second cache, the forwarding decision being retrieved from said third cache and stored in said second cache in the event of a bit on said third cache.

* * * * *